United States Patent
Lee et al.

(10) Patent No.: US 9,640,331 B2
(45) Date of Patent: May 2, 2017

(54) SOLID STATE DYE-SENSITIZED SOLAR CELL TANDEM MODULE

(71) Applicant: Sharp Laboratories of America, Inc., Camas, WA (US)

(72) Inventors: Jong-Jan Lee, Camas, WA (US); Wei Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 681 days.

(21) Appl. No.: 13/849,340

(22) Filed: Mar. 22, 2013

(65) Prior Publication Data

US 2014/0283892 A1    Sep. 25, 2014

(51) Int. Cl.
H01G 9/20 (2006.01)

(52) U.S. Cl.
CPC ......... *H01G 9/2072* (2013.01); *H01G 9/2081* (2013.01); *H01G 9/2031* (2013.01); *H01G 9/2059* (2013.01); *Y02E 10/542* (2013.01); *Y02P 70/521* (2015.11)

(58) Field of Classification Search
CPC .. H01G 9/2072; H01G 9/2081; H01G 9/2031; H01G 9/2059
USPC .................................. 136/242–265; 438/73
See application file for complete search history.

(56) References Cited

U.S. PATENT DOCUMENTS

| | | |
|---|---|---|
| 4,784,701 A | 11/1988 | Sakai et al. |
| 6,677,516 B2 | 1/2004 | Chiba et al. |
| 2006/0180197 A1 | 8/2006 | Gui et al. |
| 2007/0017568 A1 | 1/2007 | Berke |
| 2007/0062576 A1 | 3/2007 | Duerr et al. |
| 2007/0125419 A1 | 6/2007 | Gui et al. |
| 2007/0289626 A1 | 12/2007 | Brabec et al. |

(Continued)

FOREIGN PATENT DOCUMENTS

| | | | | |
|---|---|---|---|---|
| EP | 2461362 | | 12/2010 | |
| KR | WO 2012015150 A1 | * | 2/2012 | ..... H01L 31/022425 |

OTHER PUBLICATIONS

"Fabrication of solid-state dye-sensitized TiO2 solar cells combined with polypyrrole", Solar Energy Materials and Solar Cells, vol. 55, Issues 1-2, Jul. 23, 1998, pp. 113-125.*

(Continued)

*Primary Examiner* — Matthew Martin
*Assistant Examiner* — Kourtney S Carlson
(74) *Attorney, Agent, or Firm* — Law Office of Gerald Maliszewski; Gerald Maliszewski (57) ABSTRACT

A method is provided for forming a solid-state dye-sensitized solar cell (ssDSC) tandem module. The method fabricates a first panel by forming a first plurality of series-connected ssDSC cells overlying the first substrate top surface, with an electrical interface between each ssDSC cell. A second panel is fabricated in the same manner. An anisotropic conductive film (ACF) is formed overlying each electrical interface of the first panel ssDSC cells. Each ACF is aligned to a corresponding electrical interface of the second panel ssDSC cells, and the panels are bound. The result is a ssDSC tandem module comprising a first plurality of series-connected tandem sections, where each tandem section comprises a first panel ssDSC cell connected in parallel with an overlying second panel ssDSC cell. In one variation, the tandem sections include series-connected ssDSC cells.

6 Claims, 11 Drawing Sheets

(56) References Cited

U.S. PATENT DOCUMENTS

| | | | |
|---|---|---|---|
| 2009/0000655 A1* | 1/2009 | Skryabin | H01G 9/2031 |
| | | | 136/251 |
| 2009/0071538 A1 | 3/2009 | Lee et al. | |
| 2009/0242027 A1 | 10/2009 | Inoue et al. | |
| 2009/0250104 A1* | 10/2009 | Inoue | H01G 9/2031 |
| | | | 136/256 |
| 2010/0307557 A1 | 12/2010 | Yamazaki | |
| 2011/0186112 A1 | 8/2011 | Aernouts | |
| 2012/0073635 A1* | 3/2012 | Lee | H01G 9/2072 |
| | | | 136/255 |
| 2013/0180566 A1* | 7/2013 | Cho | H01L 31/02242 |
| | | | 136/244 |

OTHER PUBLICATIONS

B. O'Regan and M. Gratzel, "A low cost high efficiency solar cell based on dye-sensitized colloidal TiO2 films," Nature, 353, 737-740, Oct. 24, 1991.
M.K. Nazeeruddin et al., "Conversion of light to Electricity . . . ", J. Am. Chem. Soc., 115, 6382-6390 (1993).
L. Han at al., "High efficiency of dye-sensitized solar cell and module," IEEE 4th World Conference on Photovoltaic Energy Conversion, 179-182 (2006).
B. Li et al., "Review of recent progress in solid-state dye-sensitized solar cells," Solar Energy Materials & Solar Cells, vol. 90, pp. 549-573 (2006).
A. Nattestad et al., "Highly efficient photocathodes for dye-sensitized tandem solar cells," Nature Materials Nov. 29, 2009.
Henry Snaith et al., "Charge collection and pore filling in solid-state dye-sensitized solar cells", Nanotechnology 19, (2008), 424003.

* cited by examiner

SOLID STATE DYE-SENSITIZED SOLAR CELL TANDEM MODULE

BACKGROUND OF THE INVENTION

1. Field of the Invention

This invention generally relates to dye-sensitized solar cells (DSCs) and, more particularly, to a solid-state DSC (ssDSC) tandem module with larger active areas for greater light absorption.

2. Description of the Related Art

Figure 1:
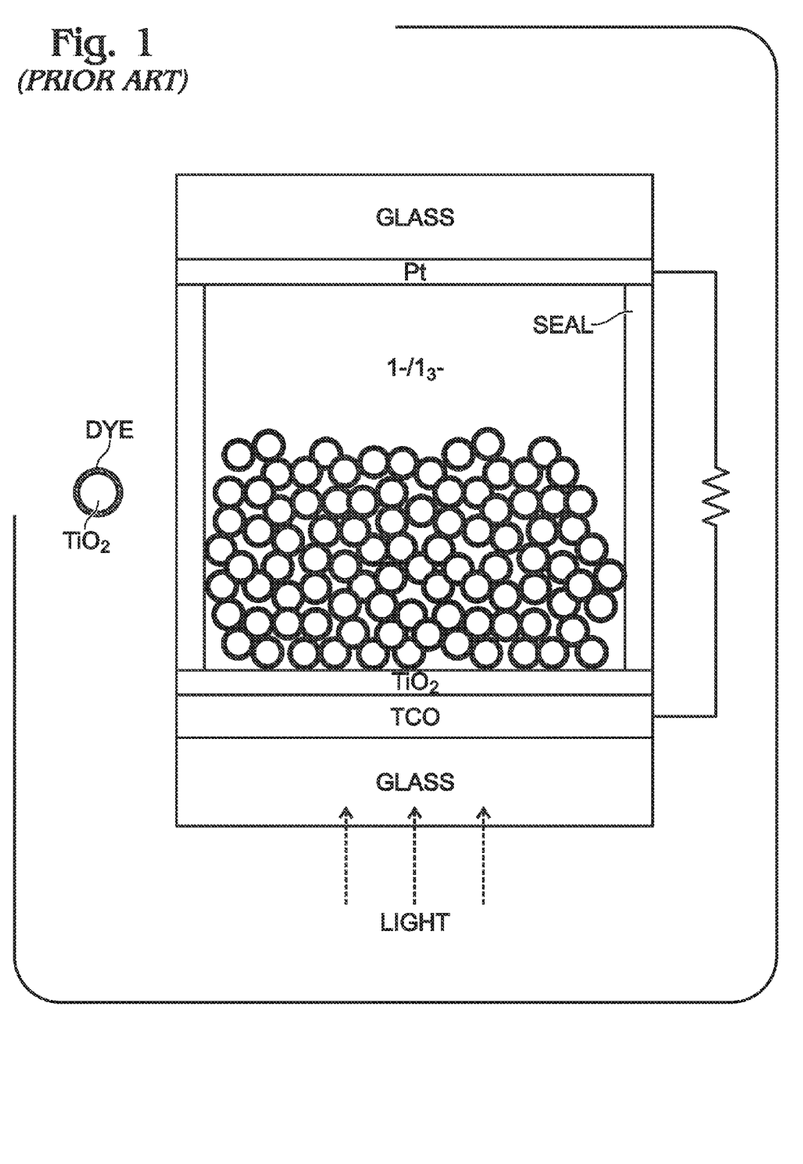
FIG. 1 is a partial cross-sectional view of typical DSC structure (prior art).

FIG. 1 is a partial cross-sectional view of typical DSC structure (prior art). DSCs had typically exhibited low conversion efficiencies until a breakthrough in 1991 by professor Grätzel and co-workers using a nanocrystalline titanium oxide ($TiO_2$) electrode modified with a photon absorbing dye. In modern DSC cells, the photoanode $TiO_2$ electrode is fabricated on a transparent conducting oxide (TCO), a monolayer of absorbed dye on a $TiO_2$ surface, a platinum (Pt) counter-electrode, and an electrolyte solution with a dissolved iodine ion/tri-iodide ion redox couple between the electrode. The structure shown in FIG. 1 has successfully demonstrated an energy conversion efficiency that exceeded 7% in 1991 (B. O'Regan and M. Gratzel, "A low cost high efficiency solar cell based on dye-sensitized colloidal TiO2 films," Nature, 353, 737-740, Oct. 24, 1991) and 10% in 1993 (M. K. Nazeeruddin et al., J. Am. Chem. Soc., 115, 6382-6390, 1993). At the present, the highest reported efficiency to date is 11.1% (L. Han et al., "High efficiency of dye-sensitized solar cell and module," IEEE $4^{th}$ World Conference on Photovoltaic Energy Conversion, 179-182, 1996).

In order to sensitize the $TiO_2$, a dye molecule is attached to the $TiO_2$ surface. When the dye molecule absorbs a photon, an electron is excited to the lowest unoccupied molecular orbital (LUMO) and is subsequently injected into the conduction band of the $TiO_2$. As a result of this, the dye molecule is transformed to its oxidized state. The injected electron percolates through the porous nanocrystalline structure to the TCO (negative electrode, anode) and finally through an external load to the counter electrode (positive electrode, cathode, and Pt). At the counter electrode, the electron is transferred to tri-iodide in the electrolyte to yield iodine ($I_3^- + 2e^- \rightarrow 3I^-$). The cycle is closed by reduction of the oxidized dye by the iodine in the electrolyte.

Another type DSC uses solid state hole transporting material (ssHTM), instead of an electrolyte solution, to complete the cell fabrication. The common ssHTM includes inorganic p-type semiconductor (e.g., CuI, CuSCN, or $CsSnI_3$), organic p-type semiconductor (e.g., spiro-MeO-TAD), ionic liquid electrolytes, and polymer electrolytes. A review of recent progress in solid state DSC can be found in B. Li et al., "Review of recent progress in solid-state dye-sensitized solar cells," Solar Energy Materials & Solar Cells, vol. 90, pp 549-573 (2006).

The most frequently explored strategy for achieving higher efficiency in solar cells has focused on the use of a tandem cell structure, through which individual cells can be tuned to a particular frequency of the spectrum. This allows the cells to be stacked such that layers capable of capturing shorter wavelengths are located on top, while longer wavelengths of light are allowed to pass through the top and travel to the lower layers. For DSC cells, several tandem cell concepts and structures have been proposed. One proposal suggests a random mixture of two or more dyes with different absorption spectra (molecular cocktail). So far, this approach has not led to higher efficiency cells when compared to the best (single) dye with broad absorption characteristics.

Figure 2:
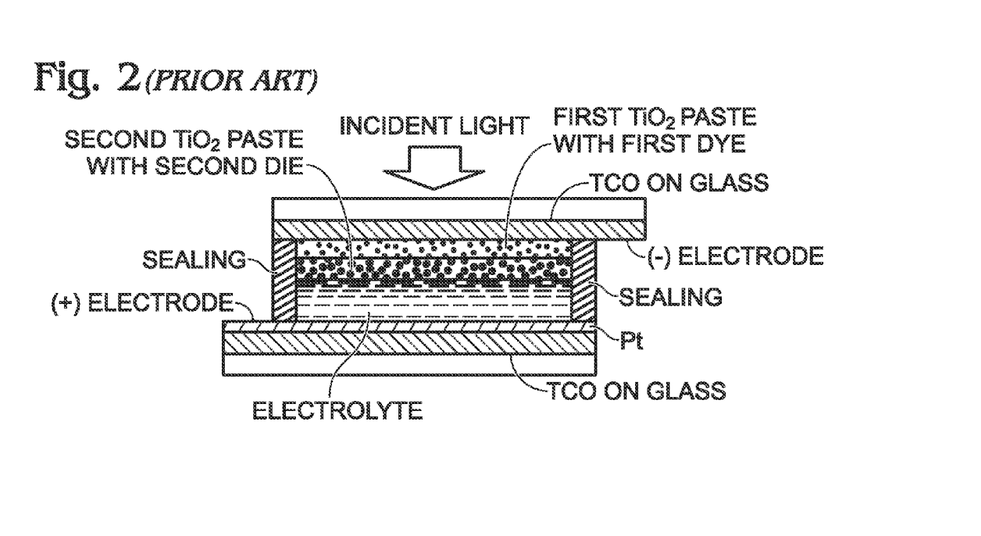
FIG. 2 is partial cross-sectional view depicting a DSC made with two separate layers of photoanode sensitized with different dyes, as described by Chiba et al. in U.S. Pat. No. 6,677,516 (prior art).

FIG. 2 is partial cross-sectional view depicting a DSC made with two separate layers of photoanode sensitized with different dyes, as described by Chiba et al. in U.S. Pat. No. 6,677,516 (prior art). In this case, one layer of $TiO_2$ contains magnesium oxide on the surface. Through surface etching, the dye molecules attached on the particles within this porous layer are removed together with the magnesium oxide layer, which can subsequently be replaced by another type of dye molecule(s). Although both the absorption spectrum and output current are improved, the output voltage is still limited to the $TiO_2$-electrolyte energy level alignment. As a result, the overall output efficiency is still lower than the 11% obtained using single dye system.

Figure 3:
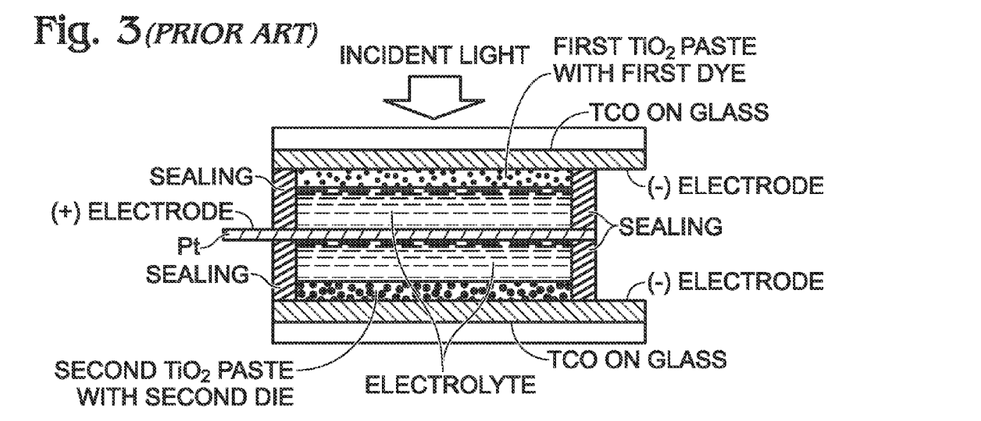
FIG. 3 is a partial cross-sectional view of a DSC where two photoanode layers are independently fabricated on separate substrates and then combined together (prior art).

FIG. 3 is a partial cross-sectional view of a DSC where two photoanode layers are independently fabricated on separate substrates and then combined together (prior art). The first cell contains the first paste and the first dye fabricated on a substrate while, separately, a second cell containing a second paste and second dye is fabricated on a second substrate. Next, the two cells as bonded together by using a sealing agent in a manner such that they oppose each other with a platinum mesh or a platinum coated carbon mesh between them. An iodine charge transport layer is deposited between the two electrode pastes. Electrically, the two solar cells are connected in parallel, so the output voltage is ultimately controlled by the lower one, while the output current is the sum of the two. Since the electrolyte is the same and the electrode pastes have similar band structures, the output voltages of the two cells are very similar. The challenges of this cell are: (a) the middle electrode (cathode) has to be transparent in order to allow light to penetrate to the bottom cell, and (b) an effective connection of the three external electrodes (two anodes, one cathode) in a small area.

Figure 4:
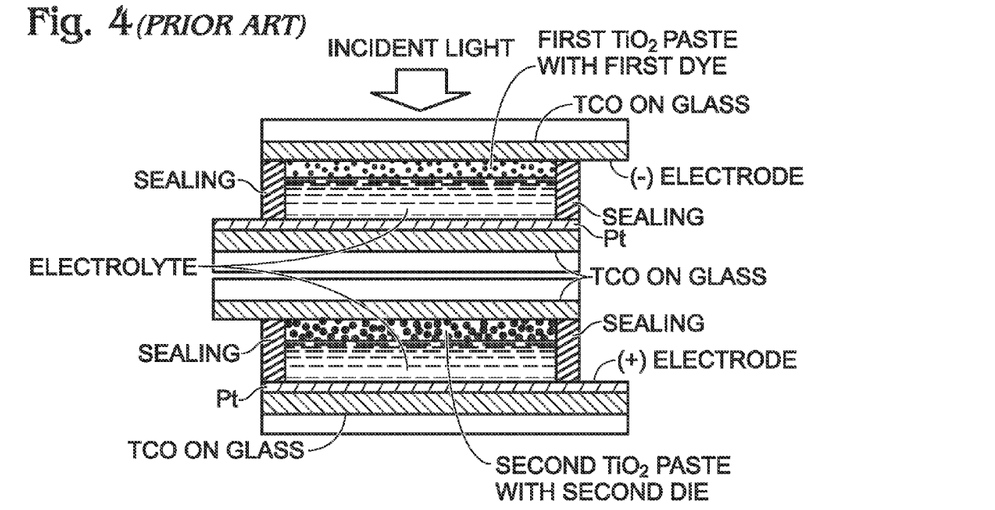
FIG. 4 is a partial cross-sectional view depicting two DSC cells stacked together (prior art).

FIG. 4 is a partial cross-sectional view depicting two DSC cells stacked together (prior art). The DSC cells are fabricated separately, and both are sealed before being brought together. The two cells can be connected either in parallel or in series. The challenges for this cell are similar to the previous structure: (a) the Pt has to be thin to be semitransparent, and (b) the electrical connection cannot occupy too much of the area. In addition to these challenges, the cost of this cell is basically twice that of a single cell.

Figure 5:
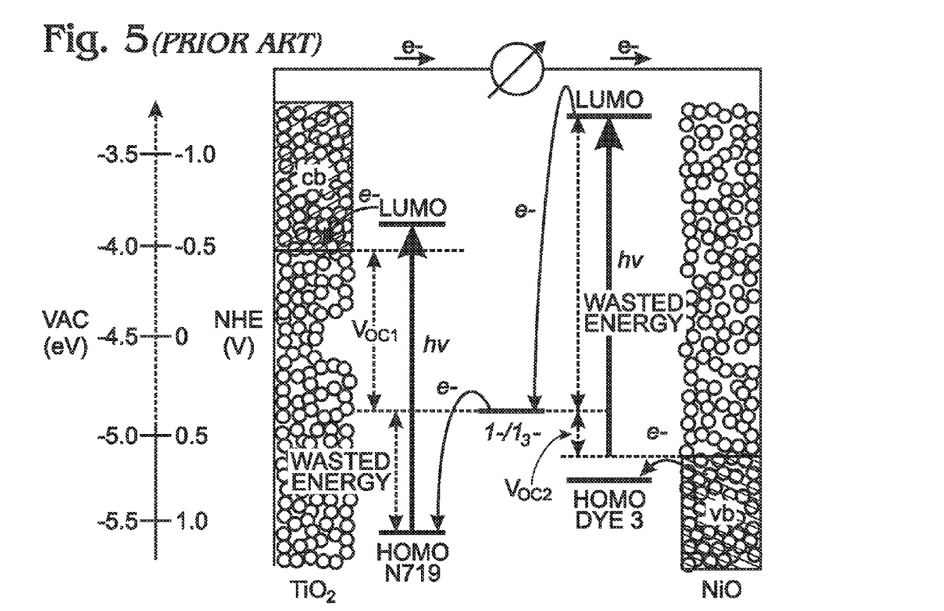
FIG. 5 is a schematic drawings of a tandem DSC structure with two external electrodes and its corresponding band diagram and charge flow (prior art).

FIG. 5 is a schematic drawings of a tandem DSC structure with two external electrodes and its corresponding band diagram and charge flow (prior art). The first semiconductor electrode functions as a hole transport material and the second as an electron transport material, whereby the two potential differences between the redox potential of the electrolyte and the two active electrodes sum up to the photovoltage. The photocathode is made of NiO nanoparticles for hole conduction and the photoanode is made of nanoparticle $TiO_2$ for electron conduction. The electrolyte functions as the electrical connection for the two DSC cells. The difference between this cell and the previous two tandem cell examples is that no Pt electrode is needed between the two cells. In the previous two examples the two nanoparticle electrodes are photoanodes. The challenges of this cell are: (1) the current generated in these two cells has to match well in order to obtain the maximum output current since the two cells are connected in series, and (2) the voltage output is limited because the electrolyte is used to connect these two cells. For the example shown in FIG. 5, the NiO cell produces a voltage output of only ~0.2V.

Figures 6A, 6B:
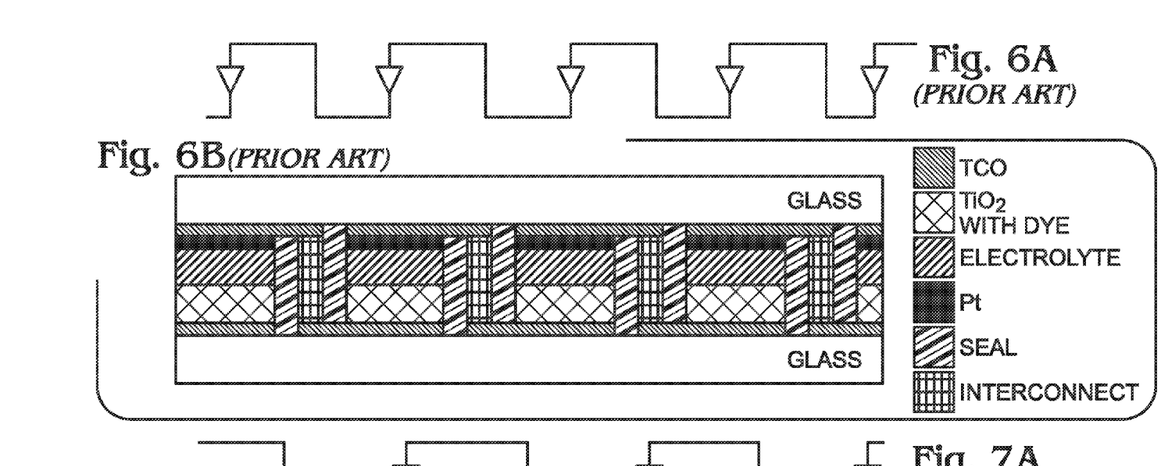
FIGS. 6A and 6B are, respectively, a schematic diagram and partial cross-sectional view of an integrated Z-contact DSC module (prior art).

FIGS. 6A and 6B are, respectively, a schematic diagram and partial cross-sectional view of an integrated Z-contact DSC module (prior art). The Z-contact modules consist of two opposing electrodes, with the connection between neighboring cells through a conducting medium. In order to prevent the conducting grids from iodine ion decay, a sealing barrier is needed. The advantage of Z-contact modules is that the $TiO_2$ paste is printed at one panel, while the disadvantages are a small active area, due to the three layers needed between the cells (two seal layers and one interconnect), and a lower fill factor resulting from the series resistance of the conductor. Note: solar cells are often represented by the parallel connection of a diode and a current source. For simplicity, (just) a diode symbol is used in the drawings to represent a solar cell.

Figures 7A, 7B:
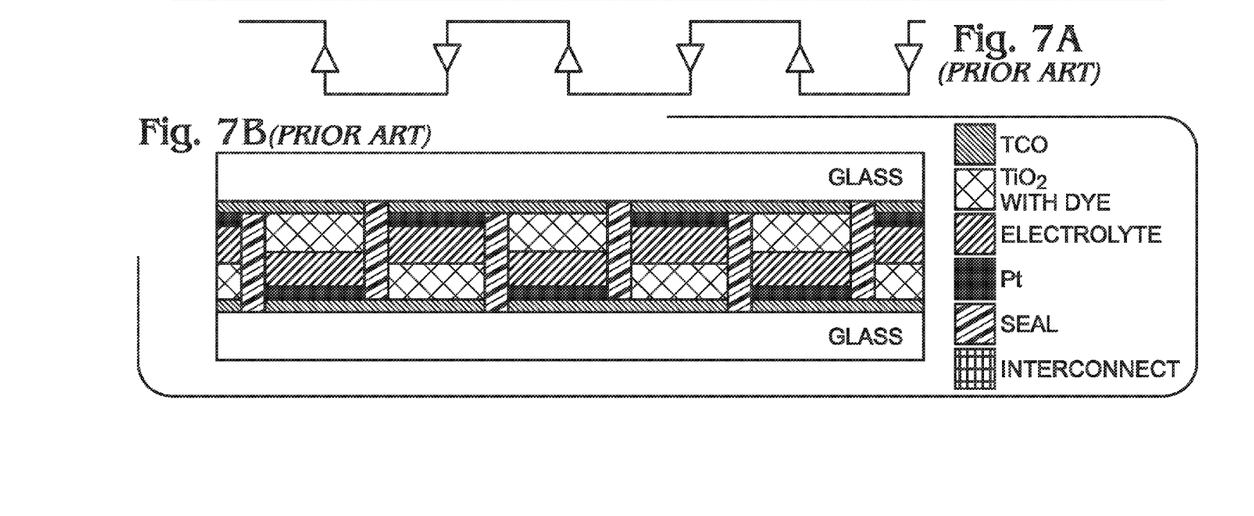
FIGS. 7A and 7B are, respectively, a schematic diagram and partial cross-sectional view of an integrated W-contact DSC module (prior art).

FIGS. 7A and 7B are, respectively, a schematic diagram and partial cross-sectional view of an integrated W-contact DSC module (prior art). The W-contact module avoids the above-mentioned Z-connect interconnect problems. However, neighboring cells are alternately biased, while still requiring separation of the cells using an effective seal. The advantage of this design is a simple structure due to the omission of the interconnections. Hence, a higher fill factor can be expected. However, the disadvantage of the W-contact modules is the necessity of maintaining all cells at an almost identical $J_{SC}$, which is a problem since two different types of cells exist, one illuminated from the TCO side and the other illuminated from the Pt side.

It would be advantageous if a solid state DSC module existed with a tandem cell design that increased light absorption and cell efficiency, and used a simple module connection with no sealing issues.

SUMMARY OF THE INVENTION

Disclosed herein is a solid state dye-sensitized solar cell (ssDSC) tandem module made from identical upper and lower panels that addresses many of the problems listed above. No sealing layers are needed between cells in this ssDSC module because a solid state hole transporting material is used instead of the liquid electrolyte common in many conventional DSCs. Although the ssDSC cells are not fabricated as a stack, the geometry of the panels essentially forms tandem sections, with one ssDSC cell on top of another. The ssDSC cells of a tandem section may be connected in series or in parallel. Electrical connections between the ssDSC cells of the two panels are made with an ACF (Anisotropic Conductive Film). This ACF film is not only conductive, but it also physically bonds the two panels together. In addition, the tandem module is a bifacial panel, meaning that the back face of the module generates electricity from ambient light reflected off surrounding surfaces, and combines with power from the front face of the panel. Further, the tandem module essentially doubles the photoanode thickness, as a conventional solid state DSCs usually has a thin photoanode (i.e. a titanium oxide [$TiO_2$] photoelectrode) with a lower photon absorption due to the limited penetration depth of the solid state hole transporting material.

Accordingly, a method is provided for forming a ssDSC tandem module. The method fabricates a first panel by forming a first plurality of series-connected ssDSC cells overlying the first substrate top surface, with an electrical interface between each ssDSC cell. Likewise, a second panel is fabricated by forming a first plurality of series-connected ssDSC cells overlying the second substrate bottom surface, with an electrical interface between each ssDSC cell. An ACF is formed overlying each electrical interface of the first panel ssDSC cells. Each ACF is aligned to a corresponding electrical interface of the second panel ssDSC cells, and the panels are bound. The result is a ssDSC tandem module comprising a first plurality of series-connected tandem sections, where each tandem section comprises a first panel ssDSC cell connected in parallel with an overlying second panel ssDSC cell.

In another aspect, the first panel is fabricated by forming a first plurality of ssDSC cells overlying the first substrate top surface, each ssDSC cell having a first electrical interface and a second electrical interface. Likewise, the second panel is fabricated by forming a first plurality of ssDSC cells overlying the second substrate top surface, each ssDSC cell having a first electrical interface and a second electrical interface. An ACF is formed overlying each electrical interface of the first panel ssDSC cells. Each ACF is aligned to a corresponding electrical interface of the second panel ssDSC cells, and the panels are bound together. The result is a ssDSC tandem module comprising a first plurality of series-connected tandem sections, where each tandem section comprises a first panel ssDSC cell connected in series to an overlying second panel ssDSC cell.

Additional details of the above-described methods, a ssDSC tandem module where the tandem sections comprise series-connected ssDSC cells, and a ssDSC tandem module with tandem sections comprise parallel-connected ssDSC cells are provided below.

DETAILED DESCRIPTION

Figure 8A:
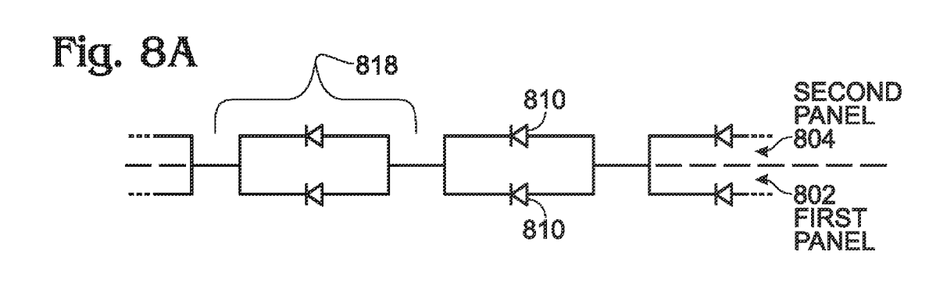
FIGS. 8A through 8C are, respectively, schematic, partial cross-sectional, and detailed partial cross-sectional views of a solid state dye-sensitized solar cell (ssDSC) tandem module.
Figure 8B:
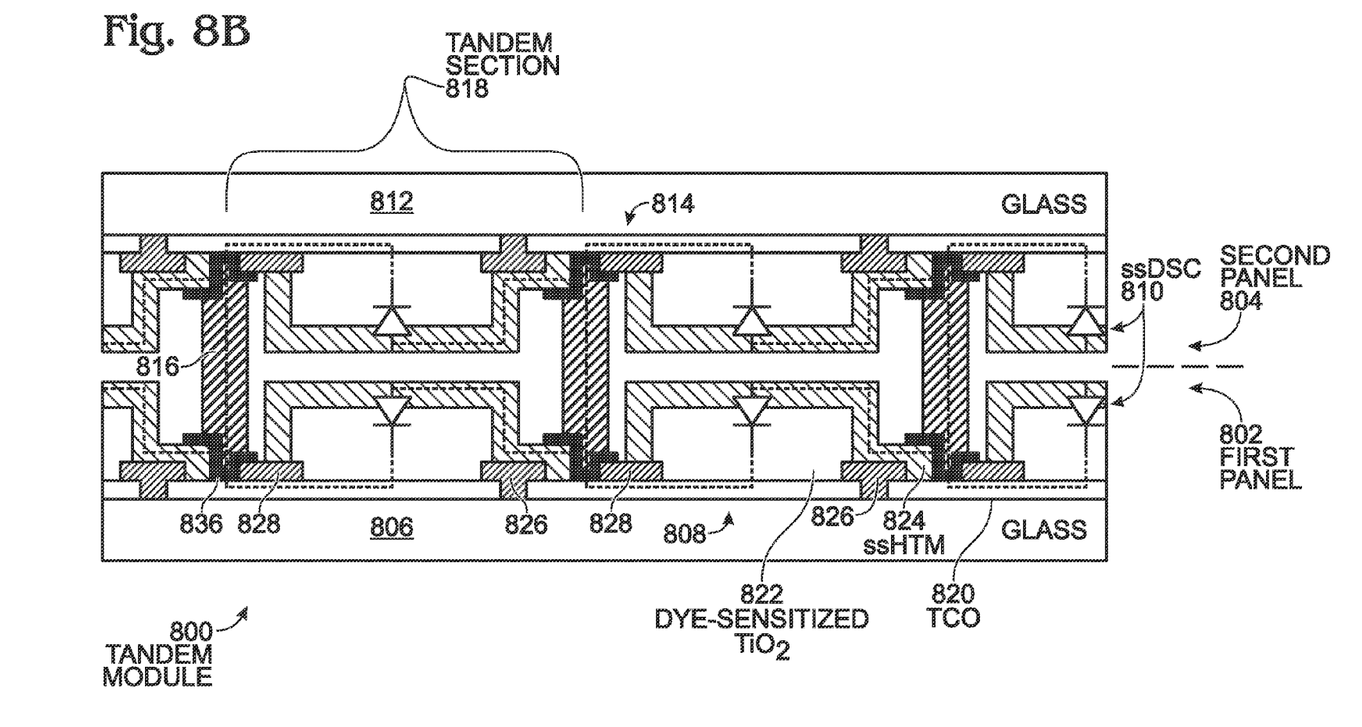
Figure 8C:
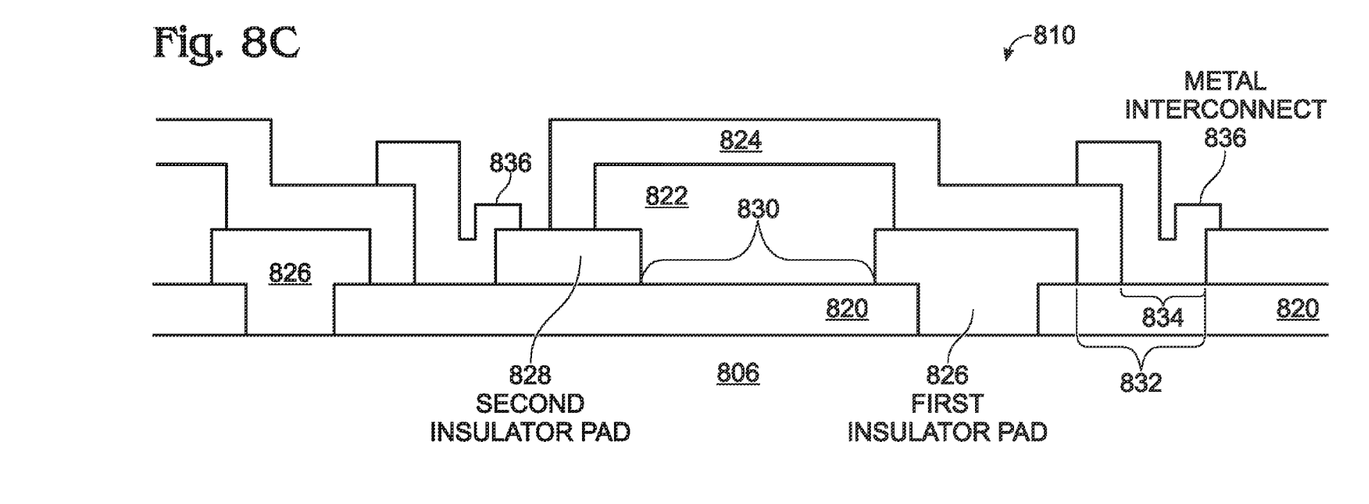

FIGS. 8A and 8B are, respectively, schematic, partial cross-sectional, and detailed partial cross-sectional views of a solid state dye-sensitized solar cell (ssDSC) tandem module. The tandem module 800 comprises a first panel 802 and a second panel 804. The first panel 802 comprises a transparent first substrate 806 (e.g. glass) with a top surface 808. A plurality of series-connected ssDSC cells 810 overlies the first substrate top surface 808. The second panel 804 overlies the first panel 802 and comprises a transparent second substrate 812 with a bottom surface 814. A plurality of series-connected ssDSC cells 810 underlies the second substrate bottom surface 814. There are electrical connections 816 between the first panel ssDSC cells 810 and the second panel ssDSC cells to form a first plurality of tandem sections 818. As can be seen more clearly in FIG. 8A, each tandem section 818 comprises a ssDSC cell from the first panel connected (electrically) in parallel to an overlying ssDSC cell from the second panel.

More particularly, the first panel plurality of ssDSC cells 810 comprise a patterned transparent conductive oxide (TCO) film overlying the first substrate 806 having a plurality of regions 820. A dye-sensitized titanium oxide (TiO$_2$) film structure 822 overlies each corresponding TCO film region 820. Note: TiO$_2$ is a porous structure, and the dye is absorbed on the TiO$_2$ surface. A solid state hole transport material (ssHTM) film 824 penetrates and coats the porous TiO$_2$ film. For the sake of simplicity, it can be said that the ssHTM film 824 overlies each corresponding dye-sensitized titanium oxide film structure 822. The section of ssHTM film 824 also overlies the TCO film region 820 of the ssDSC cell preceding in electrical series. As used herein, "preceding in electrical series" refers a device or component further upstream from the instant element with respect to current flow. In FIG. 8B, current flow proceeds from right to left. Therefore, the "TCO film region of the ssDSC cell preceding in electrical series" is the TCO region to the right of the ssDSC being described. In other words, each ssHTM film 824 overlies a portion of the TCO film region next-most to the right of an instant TCO film region, where the instant TCO film region is the TCO region under consideration.

Note that in FIGS. 8A and 8B, current flow proceeds from right to left. This is based on current-voltage (IV) measurement in a dark condition. For solar cell application, when the light impinges the device and an external load is connected, current and voltage are generated and the current flows from left to right. It is commonly known that solar cells operate in the fourth quadrant of the IV curve of a diode. For the sake of consistency, when current flow is mentioned in this document, the dark condition is assumed.

Each ssDSC 810 further comprises an insulator set for each TCO film region with a first insulator pad 826 between the instant TCO film region and a TCO film region of the ssDSC cell preceding in electrical series, and a second insulator pad 828 overlying a portion of the instant TCO film region. The result is the creation of a first zone 830 of exposed TCO film and a second zone 832 of exposed TCO film in the instant TCO film region. The dye-sensitized titanium oxide film structure 822 overlies each first zone 830. The ssHTM film 824 overlies each dye-sensitized titanium oxide film structure 822, completely overlies the first insulator pad 826 and a portion of the second zone 832 of exposed TCO film 820 preceding in electrical series connection, leaving a third zone 834 of exposed TCO film in the TCO film region preceding in electrical series connection.

A metal interconnect 836 overlies each third zone 834 of exposed TCO film. In one aspect, the electrical connections 816 are an anisotropic conductive film (ACF) formed between metal interconnects 836 of first and second panel ssDSC cells in a common tandem section 818.

Figure 9A:
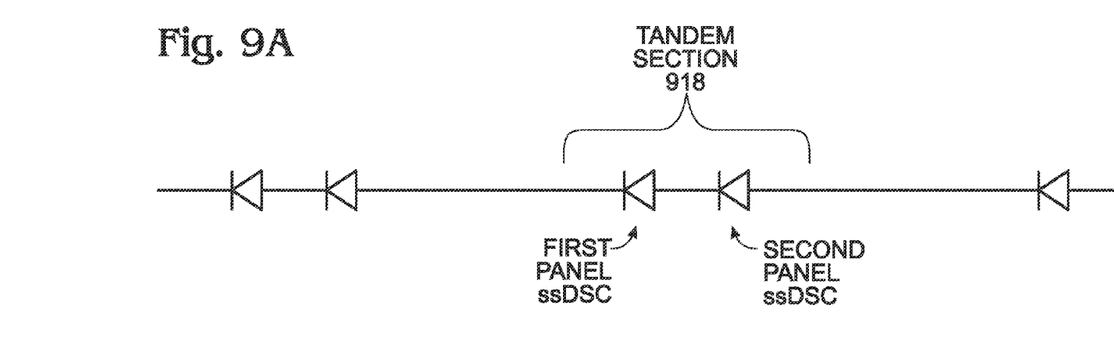
FIGS. 9A through 9C are, respectively, schematic, partial cross-sectional, and detailed partial cross-sectional views of a ssDSC tandem module variation.
Figure 9B:
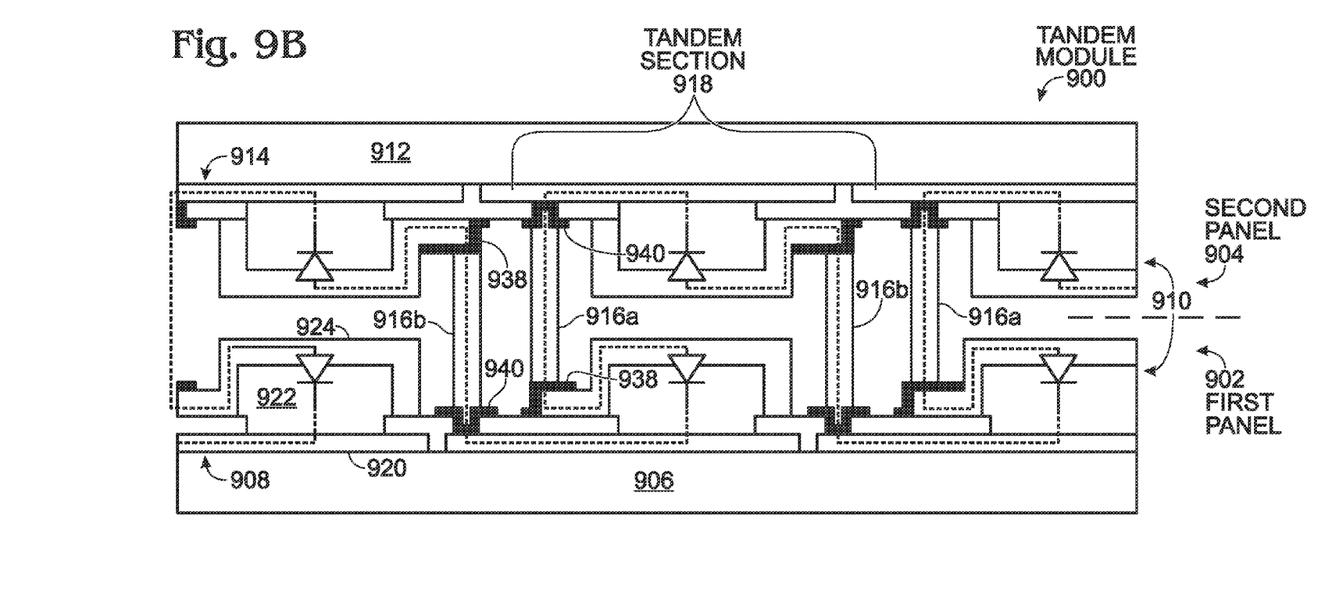
Figure 9C:
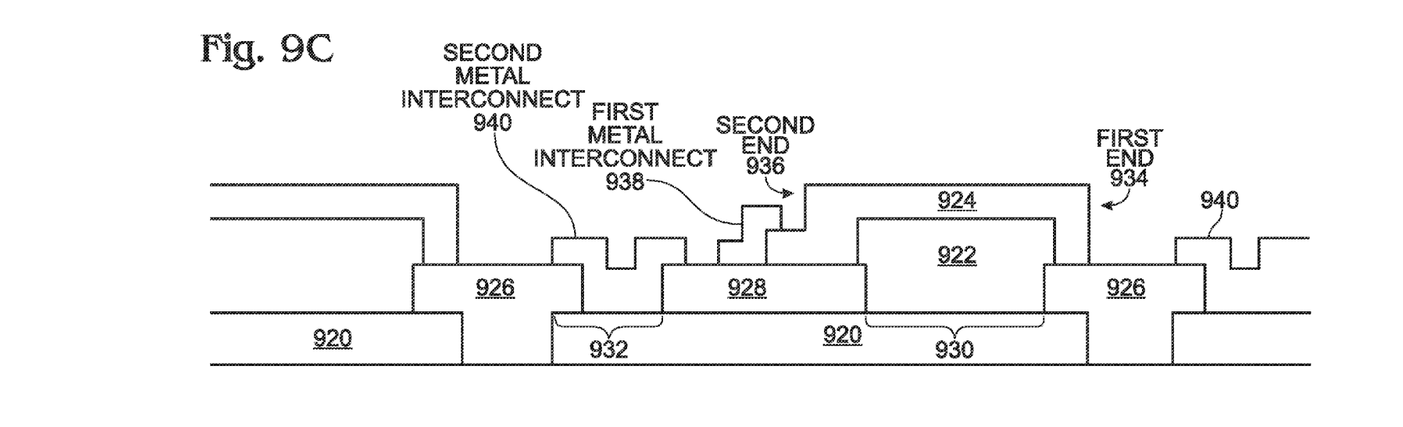

Although only the first panel has been described in detail, it should be understood that the second panel may be formed in an identical manner. In one aspect, the first panel dye-sensitized titanium oxide film structures 822 are sensitized with a first dye and the second panel dye-sensitized titanium oxide film structures are sensitized with a second dye. The second dye may either be the same or different than the first dye. The dye may be a metallorganic dye or quantum dots. A number of dyes suited for this purpose are known in the art FIGS. 9A through 9C are, respectively, schematic, partial cross-sectional, and detailed partial cross-sectional views of a ssDSC tandem module variation. The ssDSC tandem module 900 comprises a first panel 902 and a second panel 904. The first panel 902 comprises a transparent first substrate 906 with a top surface 908. A plurality of ssDSC cells 910 overlies the first substrate top surface 908. The second panel 904 overlies the first panel 902 and comprises a transparent second substrate 912 with a bottom surface 914. A plurality of ssDSC cells 910 underlies the second substrate bottom surface 914. Electrical connections 916a and 916b between the first panel ssDSC cells 910 and the second panel ssDSC cells form a first plurality of series-connected tandem sections 918. Each tandem section 918 comprises a ssDSC cell 910 from the first panel 902 connected in series to an overlying ssDSC cell 910 from the second panel 904.

The first panel plurality of ssDSC cells 910 comprise a patterned TCO film overlying the first substrate top surface 908, having a plurality of regions 920. A dye-sensitized titanium oxide film structure 922 overlies each corresponding TCO film region 920. A ssHTM film 924 overlies each corresponding dye-sensitized titanium oxide film structure 922. Each ssDSC cell 910 further comprises an insulator set for each TCO film region 920 with a first insulator pad 926 between the instant TCO film region and an adjacent TCO film region preceding in electrical series connection, and a second insulator pad 928 overlying a portion of the instant TCO film region. The result is the creation of a first zone 930 of exposed TCO film and a second zone 932 of exposed TCO film in the instant TCO film region. In the example shown, the ssDSC cell to the right of another ssDSC cell on the same panel precedes that cell in electrical series connection. However, a ssDSC on the other panel is electrically interposed between the two cells on the same panel. The dye-sensitized titanium oxide film structure 922 overlies each first zone 930 of exposed TCO film. The ssHTM film 924 overlies each dye-sensitized titanium oxide film structure 922, with a first end 934, and a second end 936 partially overlying the second insulator pad 928.

A first metal interconnect 938 overlies each ssHTM film second end 936. A second metal interconnect 940 overlies each second zone 932 of exposed TCO film. The electrical connections comprise a first ACF 916a between the first metal interconnect 938 of a first panel ssDSC cell 910 and the second metal interconnect 940 of a second panel ssDSC cell preceding in electrical series connection. A second ACF 916b exists between the second metal interconnect 940 of the first panel ssDSC with the first metal interconnect 938 of a second panel ssDSC cell following in electrical series connection. As above, the direction of electrical series connections follow the direction of current flow, from right to left, see FIG. 9A.

Although only the first panel has been described in detail, it should be understood that the second panel may be formed in an identical manner. In one aspect, the first panel dye-sensitized titanium oxide film structures 922 are sensitized with a first dye and the second panel dye-sensitized titanium oxide film structures are sensitized with a second dye. The second dye may either be the same or different than the first dye.

Figure 10A:
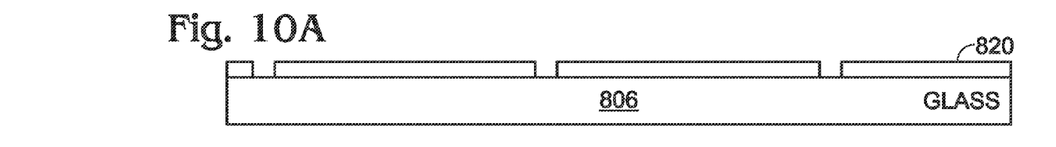
FIGS. 10A through 10E depict steps in the fabrication of the ssDSC tandem module of FIG. 8B.
Figure 10B:
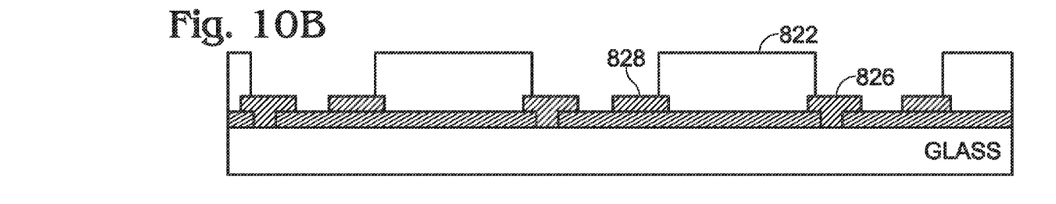

FIGS. 10A through 10E depict steps in the fabrication of the ssDSC tandem module of FIG. 8B. The initial DSC cell process steps are well known. The process starts with glass having a TCO (transparent conducting oxide) coating. The TCO may be one the following chemical compositions: $SnO_2$, $SnO_2$:F, $In_2O_3$, $In_2O_3$—$SnO_2$, ZnO, or ZnO:Al. In FIG. 10A the TCO layer is patterned. In FIG. 10B, the substrate is coated with an insulator layer and patterned to form first insulator pad 826 and second insulator pad 828. Then, $TiO_2$ paste is printed, sintering, and dye soaking to form dye-sensitized $TiO_2$ regions 822.

Figure 10C:
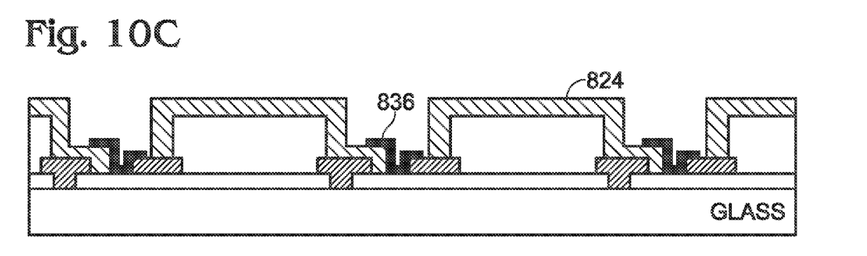

In FIG. 10C solid state hole transporting materials are deposited. Although not shown, the conductivity of ssHTM film 824 can be improved by depositing thin metal layers, using a material such as Ag, Au, Pt, etc., on the ssHTM. The exposed TCO film is coated with a metal interconnect layer 836, using a material such as Ag, to reduce contact resistance.

Figure 10D:
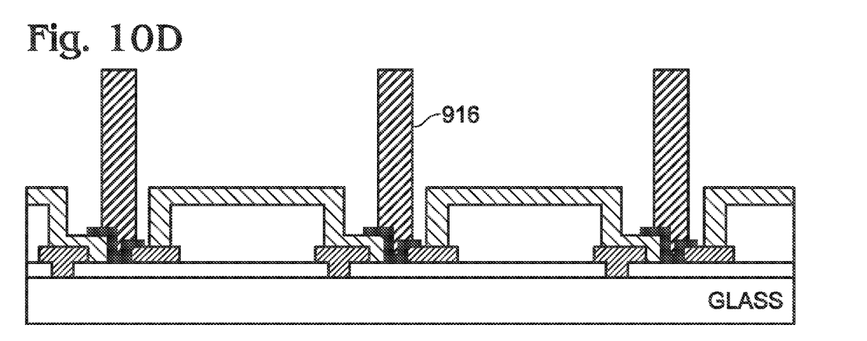

Contrary to conventional processes, in FIG. 10D an anisotropic conductive film (ACF) 916 is formed. This AFC is used both as an electrical connection, and to bond the two panels together. Common conduction glues can also be used.

ACF is a lead-free interconnect system that is commonly used in liquid crystal display (LCD) manufacturing to make the electrical and mechanical connections from the driver electronics to the glass substrates of the LCD. In process, the ACF material is first deposited on the base substrate (i.e. the first panel) by a lamination, dispense, or printing process. The device or secondary substrate (i.e. the second panel) is then placed in position over the base substrate and the two sides are pressed together to mount the secondary substrate or device to the base substrate. In many cases this mounting process is done with no heat or a minimal amount of heat that is just sufficient to cause the anisotropic material to become slightly tacky. The material is also available in a paste form referred to as anisotropic conductive paste (ACP), and both are grouped together as anisotropic conductive adhesives (ACAs).

Figure 10E:
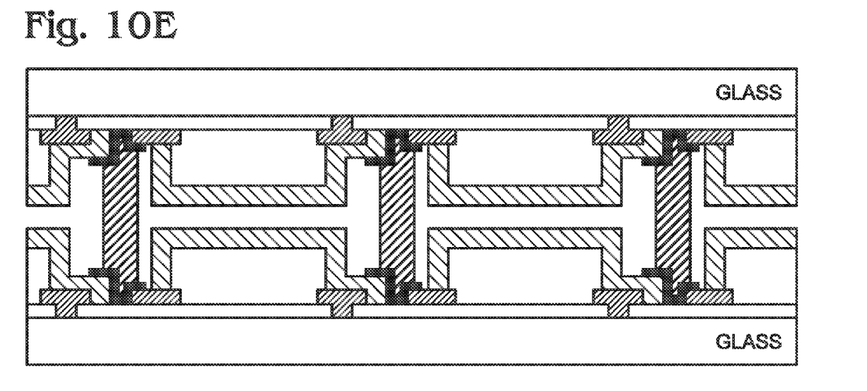

In FIG. 10E the two glass plate panels and pressed together. Curing may needed to secure the electrical connection and physical bonding. Since the ssDSC cells in each tandem section are connected in parallel, voltage matching of these ssDSCs may be an issue.

Although the fabrication steps of the tandem module of FIG. 9B are not explicitly shown, they are essentially the same as the steps described above in the explanation of FIGS. 10A-10E. However, in the tandem module of FIG. 9B there are twice the number ACFs as compared to the tandem module of FIG. 8B, so the effective cell area is less. In addition, current matching of ssDSCs in each tandem section is important in order to extract the highest power.

Figure 11:
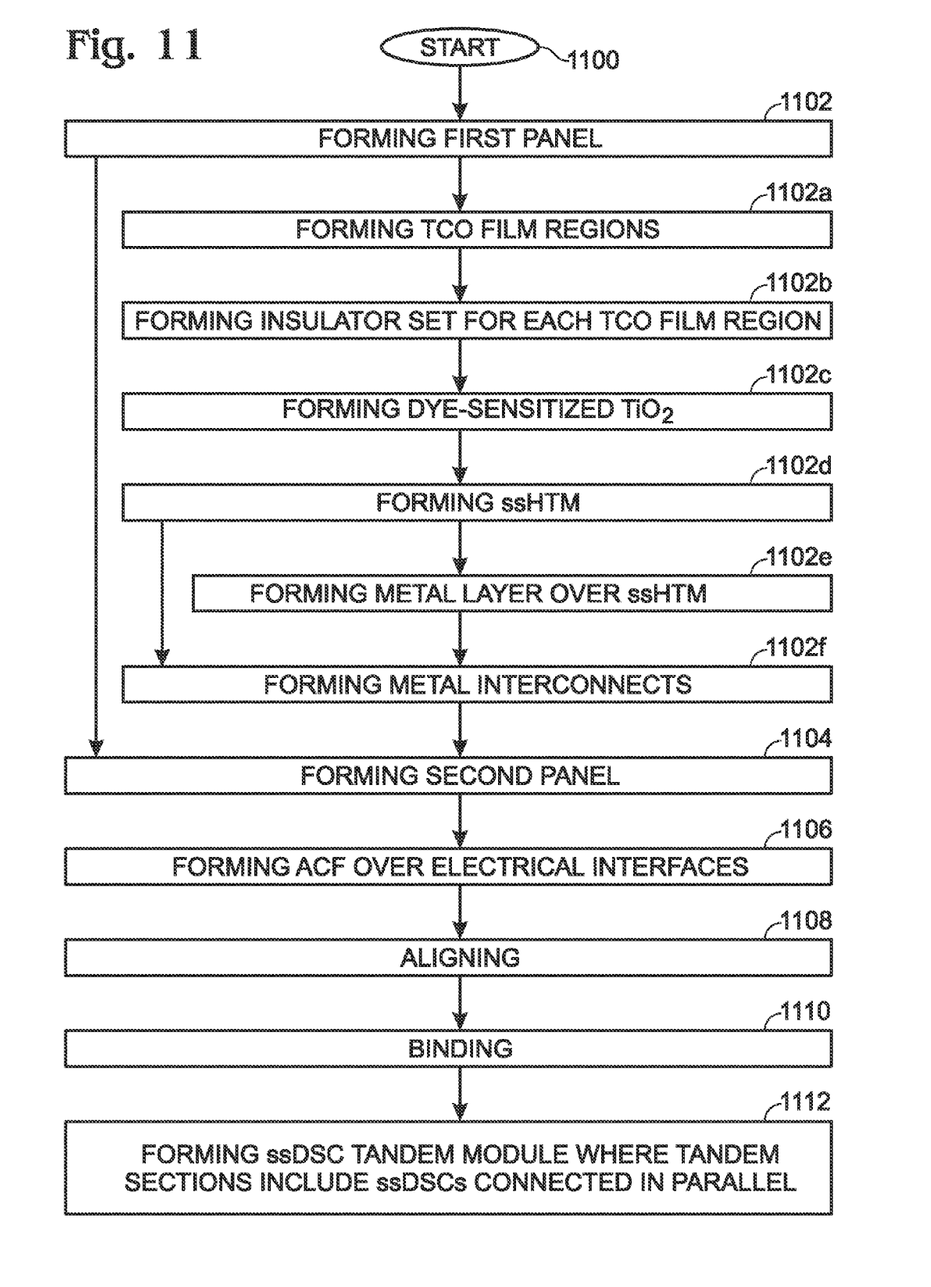
FIG. 11 is a flowchart illustrating a method for forming a ssDSC tandem module.

FIG. 11 is a flowchart illustrating a method for forming a ssDSC tandem module. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 forms a first panel with a transparent first substrate provided having a top surface. A first plurality of series-connected ssDSC cells are formed overlying the first substrate top surface, with an electrical interface between each ssDSC cell. Step 1104 forms a second panel with a transparent second substrate provided having a bottom surface. A first plurality of series-connected ssDSC cells are formed overlying the second substrate bottom surface, with an electrical interface between each ssDSC cell. Step 1106 forms an ACF overlying each electrical interface of the first panel ssDSC cells. Step 1108 aligns each ACF to a corresponding electrical interface of the second panel ssDSC cells. Step 1110 binds the first panel to the second panel. Step 1112 forms a ssDSC tandem module comprising a first plurality of series-connected tandem sections, where each tandem section comprises a first panel ssDSC cell connected in parallel with an overlying second panel ssDSC cell.

In one aspect, forming the first plurality of series-connected ssDSC cells overlying the first substrate top surface in Step 1102 includes the following substeps. Step 1102a forming a patterned TCO film overlying the first substrate top surface, having a first plurality of regions. Some examples of TCO materials include $SnO_2$, $SnO_2$:F, $In_2O_3$, $In_2O_3$—$SnO_2$, ZnO, and ZnO:Al. However, other materials are possible. Step 1102c forms a dye-sensitized titanium oxide film structure overlying each corresponding TCO film region. Step 1102d forms a ssHTM film overlying each corresponding dye-sensitized titanium oxide film structure and the TCO film region of a ssDSC cell TCO film region preceding in electrical series connection. As noted in the example of FIG. 8B, a preceding electrical series connection is to the right of any particular ssDSC cell.

Step 1102b forms an insulator set for each TCO film region comprising a first insulator pad between the instant TCO film region and a TCO film region preceding in electrical series connection. Step 1102b also forms a second insulator pad overlying a portion of the instant TCO film region, to create a first zone of exposed TCO film and a second zone of exposed TCO film in the instant TCO film region. Then, forming the dye-sensitized titanium oxide film structure overlying each corresponding TCO film region in Step 1102c includes forming the dye-sensitized titanium oxide film structure overlying each first zone of exposed TCO film. Step 1102d deposits the ssHTM film overlying each dye-sensitized titanium oxide film structure, completely overlying the first insulator pad and a portion of the second zone of exposed TCO film preceding in electrical series connection, leaving a third zone of exposed TCO film in the TCO film region preceding in electrical series connection. Step 1102f forms a metal interconnect overlying each third zone of exposed TCO film, and forming the ACF overlying each electrical interface of the first panel ssDSC cells in Step 1106 includes forming the ACF overlying each metal interconnect. In one aspect, Step 1102e forms a thin metal layer overlying each ssHTM film from a material such as Ag, Au, or Pt. Note: although not explicitly shown, the substeps for the fabrication of the second panel of Step 1104 are the same as for the first panel.

In another aspect, binding the first panel to the second panel in Step 1110 includes binding the first panel to the second panel using the ACF.

In one variation, forming first panel dye-sensitized titanium oxide film structures in Step 1102c includes forming dye-sensitized titanium oxide film structures sensitized with a first dye. Then, forming the second panel includes forming second panel dye-sensitized titanium oxide film structures sensitized with a second dye that may be either the same and different than the first dye.

Figure 12:
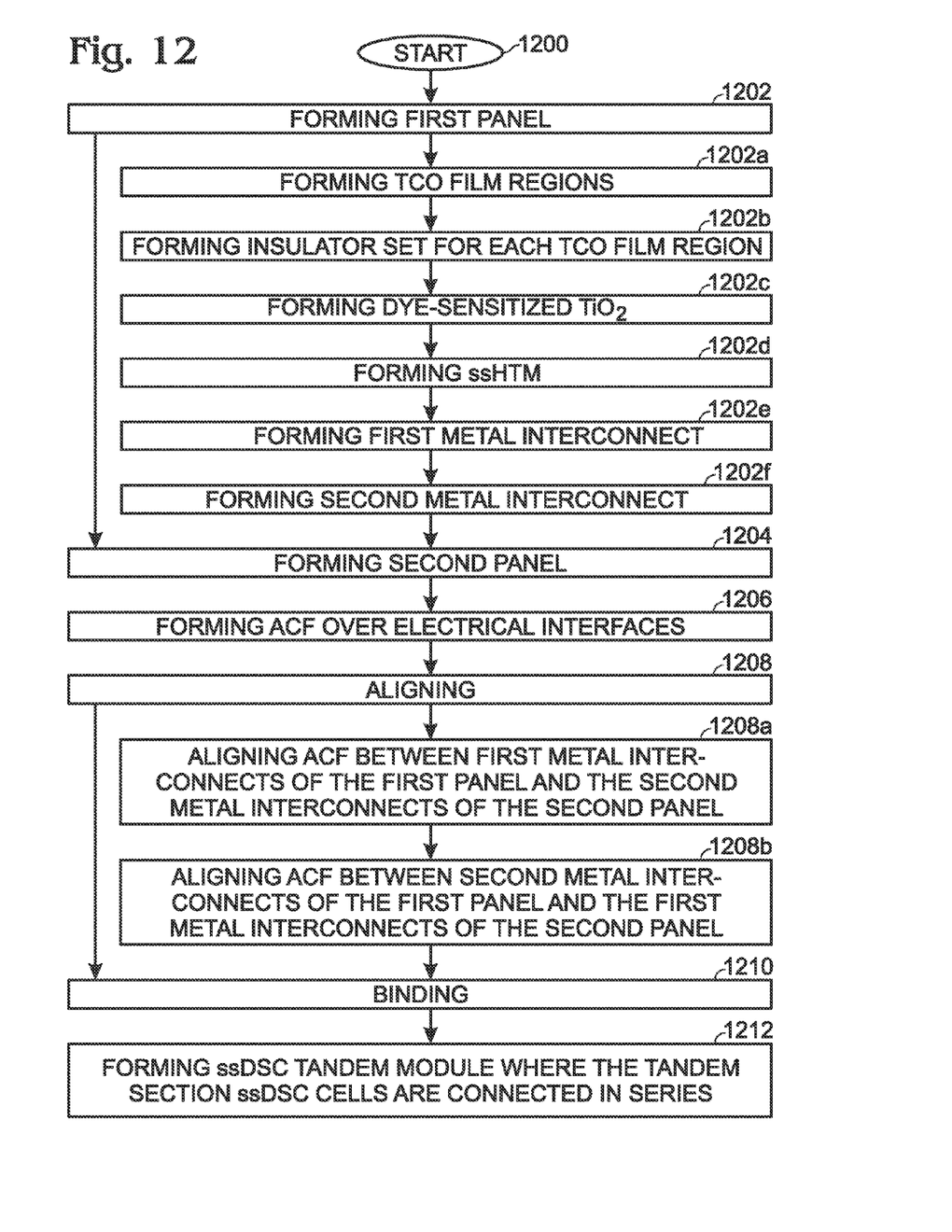
FIG. 12 is a flowchart illustrating a variation in the method for forming a ssDSC tandem module.

FIG. 12 is a flowchart illustrating a variation in the method for forming a ssDSC tandem module. The method begins at Step 1200. Step 1202 forms a first panel by providing a transparent first substrate with a top surface, and forming a first plurality of ssDSC cells overlying the first substrate top surface. Each ssDSC cell has a first electrical interface and a second electrical interface. Step 1204 forms a second panel by providing a transparent second substrate with a top surface, and forming a first plurality of ssDSC cells overlying the second substrate top surface. Again, each ssDSC cell has a first electrical interface and a second electrical interface. Step 1206 forms an ACF overlying each electrical interface of the first panel ssDSC cells. Step 1208 aligns each ACF to a corresponding electrical interface of the second panel ssDSC cells. Step 1210 binds the first panel to the second panel. Step 1212 forms a ssDSC tandem module comprising a first plurality of series-connected tandem sections, where each tandem section comprises a first panel ssDSC cell connected in series to an overlying second panel ssDSC cell.

In one aspect, forming the first plurality of ssDSC cells overlying the first substrate top surface in Step 1202 includes the following substeps. Step 1202a forms a patterned TCO film overlying the first substrate top surface, having a first plurality of regions. Step 1202c forms a dye-sensitized titanium oxide film structure overlying each corresponding TCO film region. Step 1202d forms a ssHTM film overlying each corresponding dye-sensitized titanium oxide film structure.

In another aspect, Step 1202b forms an insulator set for each TCO film region comprising a first insulator pad between the instant TCO film region and an adjacent TCO film region preceding in electrical series connection. As noted in the discussion of FIG. 9B, when assembled, a ssDSC cell on the second panel is interposed between the instant ssDSC and the adjacent ssDSC on the first panel preceding in electrical series connection. Step 1202b also forms a second insulator pad overlying a portion of the instant TCO film region, to create a first zone of exposed TCO film and a second zone of exposed TCO film in the instant TCO film region. Then, forming the dye-sensitized titanium oxide film structure overlying each corresponding TCO film region in Step 1202c includes forming the titanium oxide film structure overlying each first zone of exposed TCO film. Step 1202d deposits the ssHTM film overlying each titanium oxide film structure, with a first end, and a second end partially overlying the second insulator pad.

Continuing, Step 1202e forms a first metal interconnect overlying each ssHTM second end. Step 1202f forms a second metal interconnect overlying each second zone of exposed TCO film. Then, aligning each ACF to the corresponding electrical interface of the second panel ssDSC cells in Step 1208 includes substeps. Step 1208a aligns a first ACF between the first metal interconnect of a first panel ssDSC cell and the second metal interconnect of a second panel ssDSC cell preceding in electrical series connection. Step 1208b aligns a second ACF between the second metal interconnect of the first panel ssDSC cell with the first metal interconnect of a second panel ssDSC cell following in electrical series connection.

In one aspect not shown, a thin metal layer may be formed overlying each ssHTM film from a material such as Ag, Au, or Pt. Note: although not explicitly shown, the substeps for the fabrication of the second panel of Step 1204 would be the same as for the first panel. In another aspect, binding the first panel to the second panel in Step 1210 includes binding the first panel to the second panel using the ACF.

In one variation, forming first panel dye-sensitized titanium oxide film structures in Step 1202c includes forming dye-sensitized titanium oxide film structures sensitized with a first dye. Then, forming the second panel includes forming second panel dye-sensitized titanium oxide film structures sensitized with a second dye that may be either the same and different than the first dye. Note: although not explicitly described, the materials associated with the tandem module of FIG. 12 may be the same as the ones listed above for the tandem module of FIG. 11.

A ssDSC tandem module and associated fabrication methods have been provided. Examples of particular process steps and materials have been presented to illustrate the invention. However, the invention is not limited to merely these examples. Other variations and embodiments of the invention will occur to those skilled in the art.

We claim:
1. A method for forming a solid state dye-sensitized solar cell (ssDSC) tandem module, the method comprising:
   forming a first panel as follows:
      providing a transparent first substrate with a top surface;
      forming a transparent conductive oxide (TCO) film overlying the first substrate patterned into a first plurality of TCO regions, each region comprising a first zone, a second zone, and a third zone;
      forming a first plurality of series-connected ssDSC cells overlying the first substrate top surface, each ssDSC cell comprising a TCO film region, a dye-sensitized titanium oxide film overlying the TCO film first zone, and a solid state hole transport material (ssHTM) film overlying the dye-sensitized titanium oxide film and a TCO film second zone of an adjacent ssDSC cell preceding in electrical series in the first panel, and where preceding in electrical series refers to upstream with respect to current flow in the first panel;
   forming a second panel as follows:
      providing a transparent second substrate with a bottom surface;
      forming a TCO film overlying the second substrate patterned into a first plurality of TCO film regions, each region comprising a first zone, a second zone, and a third zone;
      forming a first plurality of series-connected ssDSC cells overlying the second substrate bottom surface, each ssDSC cell comprising a TCO film region, a dye-sensitized titanium oxide film overlying the TCO film first zone, and a ssHTM film overlying the dye-sensitized titanium oxide film and a TCO film second zone of an adjacent ssDSC cell preceding in electrical series in the second panel;
   forming a metal interconnect overlying the TCO film third zone of each ssDSC cell of the first and second panels;
   forming an anisotropic conductive film (ACF) overlying each metal interconnect of the first panel ssDSC cells;
   aligning each ACF to a corresponding metal interconnect of the second panel ssDSC cells;
   binding the first panel to the second panel; and,
   forming a ssDSC tandem module comprising a first plurality of series-connected tandem sections, where each tandem section comprises a first panel ssDSC cell connected in parallel with an overlying second panel ssDSC cell.

2. The method of claim 1 wherein forming the first plurality of series-connected ssDSC cells overlying the first substrate top surface further includes:
  forming an insulator set for each TCO film region comprising a first insulator pad between the TCO film first zone in an instant ssDSC cell and the TCO film second zone of an adjacent ssDSC cell preceding in electrical series connection in the same panel, and a second insulator pad overlying a portion of the TCO film second zone of the instant ssDSC cell; and,
  wherein forming the ssHTM film includes depositing the ssHTM film overlying each dye-sensitized titanium oxide film structure, completely overlying the first insulator pad and a portion of the TCO film second zone of the adjacent ssDSC cell preceding in electrical series connection in the same panel, leaving the TCO film third zone in the adjacent ssDSC cell preceding in electrical series connection in the same panel.

3. The method of claim 1 wherein forming the patterned TCO film includes forming the TCO film from a material selected from a group consisting of $SnO_2$, $SnO_2$:F, $In_2O_3$, $In_2O_3$—$SnO_2$, ZnO, and ZnO:Al.

4. The method of claim 1 wherein forming the first plurality of series-connected ssDSC cells overlying the first substrate top surface further includes forming a thin metal layer overlying each ssHTM film from a material selected from a group consisting of Ag, Au, and Pt.

5. The method of claim 1 wherein binding the first panel to the second panel includes binding the first panel to the second panel using the ACF.

6. The method of claim 1 wherein forming first panel dye-sensitized titanium oxide film structures includes forming dye-sensitized titanium oxide film structures sensitized with a first dye; and,
  wherein forming the second panel includes forming second panel dye-sensitized titanium oxide film structures sensitized with a second dye selected from a group consisting of the same and different than the first dye.

* * * * *